United States Patent
Berger

Patent Number: 5,852,410
Date of Patent: Dec. 22, 1998

[54] LASER OPTICAL PATH DEGRADATION DETECTING DEVICE

[75] Inventor: Gerald M. Berger, Northbrook, Ill.

[73] Assignee: Maxtec International Corporation, Chicago, Ill.

[21] Appl. No.: 811,318

[22] Filed: Mar. 4, 1997

[51] Int. Cl.⁶ .................................................. G08G 1/16
[52] U.S. Cl. ...................... 340/903; 340/435; 340/436; 340/901; 340/904; 307/10.1; 180/169; 342/70; 342/71; 342/72; 367/909; 356/4.01; 356/4.02; 356/5.01; 356/218
[58] Field of Search ................................. 340/435, 436, 340/901, 903, 904; 307/10.1; 356/239, 4.01, 4.02, 4.06, 4.07, 4.08, 4.09, 5.01, 5.02–5.08, 6; 180/167, 168, 169, 170; 342/70, 71, 72; 367/909, 112, 96, 97, 107

[56] References Cited

U.S. PATENT DOCUMENTS

| | | |
|---|---|---|
| H376 | 12/1987 | Bremer .................................... 356/239 |
| 4,121,890 | 10/1978 | Braun . |
| 4,451,146 | 5/1984 | Grage et al. . |
| 4,521,107 | 6/1985 | Chaborski et al. . |
| 4,627,723 | 12/1986 | French et al. . |
| 4,728,188 | 3/1988 | Kitagawa et al. ....................... 356/218 |
| 4,950,075 | 8/1990 | Ichinose et al. . |
| 5,163,063 | 11/1992 | Yoshikawa et al. ....................... 372/38 |
| 5,180,922 | 1/1993 | Hug ............................................ 356/5 |
| 5,313,262 | 5/1994 | Leonard . |
| 5,600,561 | 2/1997 | Okamura ................................. 364/460 |

*Primary Examiner*—Nina Tong
*Attorney, Agent, or Firm*—Richard A. Zachar

[57] ABSTRACT

An optical path degradation detecting device having a laser distance detector which uses a laser beam to detect the distance between two objects and which generates distance signals representative of the distance between the two objects. A first predetermined point signal is generated upon the distance signals being in a distance representative of a first predetermined distance or less, and a second predetermined point signal is generated upon the distance signals being in a distance representative of a second predetermined distance or less, wherein the second predetermined distance is less than the first predetermined distance. A fault signal is generated if the second predetermined point signal is generated within a predetermined time interval relative to the generation of the first predetermined point signal.

11 Claims, 6 Drawing Sheets

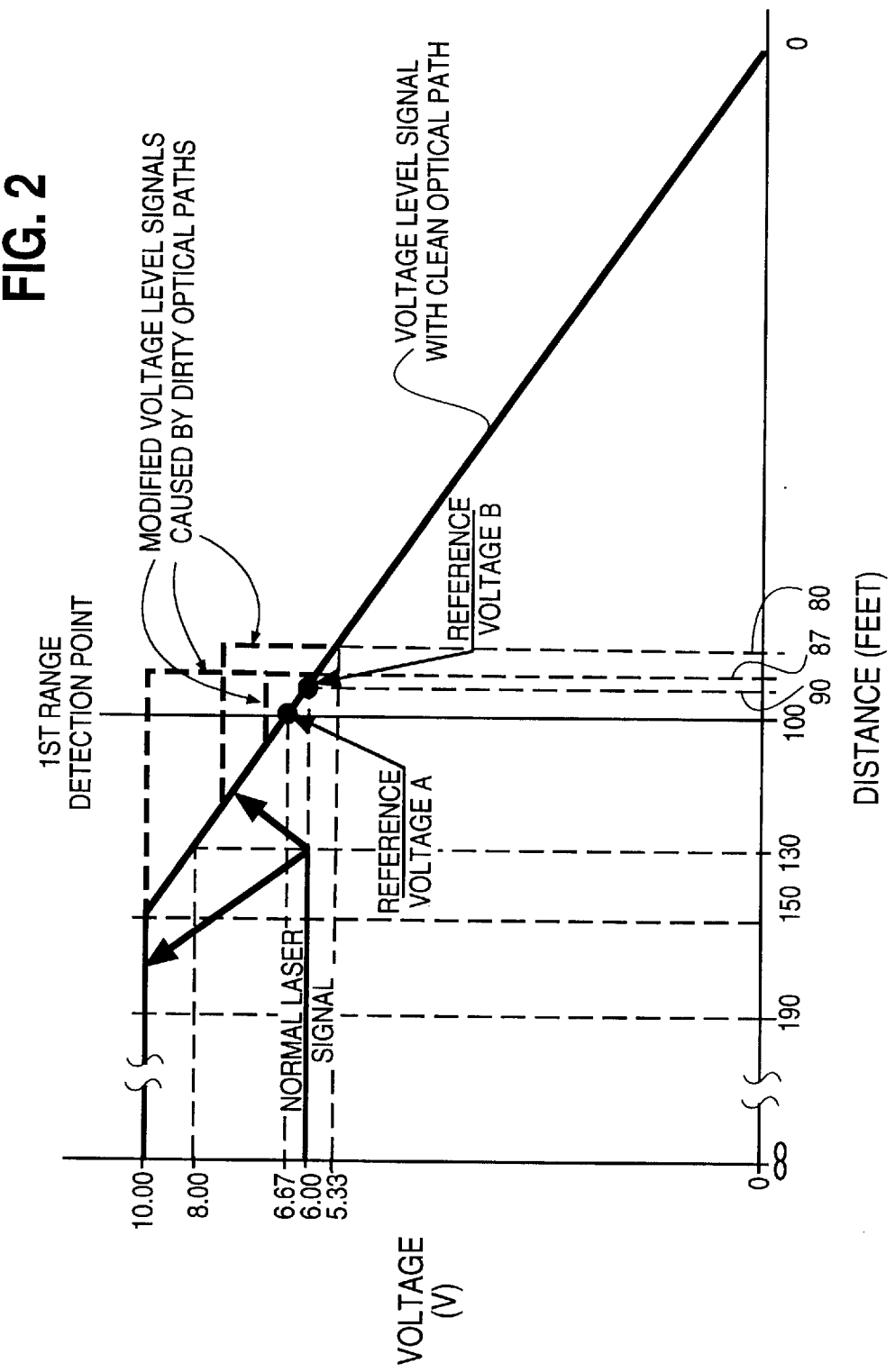

LASER OPTICAL PATH DEGRADATION DETECTING DEVICE

FIELD OF THE INVENTION

This invention pertains to a laser system for anti-collision applications, and more particularly, pertains to a device for detecting degradation of the laser's optical path in such systems.

BACKGROUND OF THE ART

Many applications, such as industrial cranes, require the use of anti-collision devices or systems to prevent collision between two objects such as between two movable cranes or between a movable crane and a stationary wall. Such anti-collision systems typically consist of an energy beam transmitting and receiving member on one of the objects and a beam reflector on the other object. A measurable characteristic of the energy beam varies with the distance or distance over which the beam travels from the energy beam transmitting and receiving member, reflecting off of the beam reflector and being received again by the energy transmitting and receiving member. In this manner, by analyzing the characteristics of the reflected laser beam, the distance or range between the objects may be determined, and the movement of the objects halted when the distance between the objects becomes too small. Various energy beams, particularly radio frequency waves and radar, have been used in such systems. Recently, laser beams have been employed as the energy beams in such systems due to the fact that lasers are not subject to radio interferences and their dispersion can be accurately controlled to prevent erroneous reflections.

It is also known in collision avoidance systems to provide a predetermined minimum distance point, whereby when distance between the two objects decreases to the minimum distance point, the movement of the objects is automatically stopped, to prevent their collision. Also, it is known to provide collision avoidance systems having a plurality of predetermined distance points, in which the objects slow down slightly when the distance between the objects decreases to a first predetermined distance point, the objects slow down further when the distance between the objects decreases still further to a second predetermined distance point, and the objects stop moving when the distance between the objects decreases to a third predetermined distance point. It is important that the laser be able to identify when the predetermined distance points have been reached, so that proper corrective action may be timely effected, in order to assure the avoidance of collisions.

A shortcoming of collision avoidance systems which utilize lasers or any other light source is the potential for gradual degradation to the laser optical path, for example, due to gradual build-up of dirt or the like on a lens or reflector of the laser system. Degradation in the laser's optical path may lead to a sufficient enough loss in the reception of the laser that the ability to analyze the characteristic of the reflected laser to determine the range or distance between two objects is lost. Accordingly, there is a need to be able to detect when degradation in a laser's optical path has become so significant that it results in the inability to determine when one of the aforementioned predetermined distance points have been reached. Moreover, in many applications, even when the laser's optical path is completely clean, when the distance between the objects is at or near its greatest, the strength of the received reflected laser is insufficient to allow distance determinations to be made. The current laser systems have no way of determining whether their laser transmitting and receiving member is sufficiently out of range from their target and, therefore, unable to make distance determinations, or whether the laser's optical path efficiency is reduced due to dirt accumulated on the laser optics or the reflector which causes a loss of the ability to make distance determinations.

SUMMARY OF THE PRESENT INVENTION

In accordance with the present invention, an optical path degradation detecting device is provided for detecting when the optical path of a laser used in a collision avoidance application has degraded to an unacceptable level, and generating a fault signal when such unacceptable optical path degradation is detected as distinguished from the instances in which the distance between objects becomes so large that the laser is not received sufficiently enough to make distance determinations, in which instances no fault signal is generated. The optical path degradation detecting device comprises a laser distance detector which uses a laser beam to detect the distance between two objects, and which generates distance signals representative of the distance between the two objects. Means responsive to the distance signals generates a first predetermined point signal upon the distance signals being in a range representative of a first predetermined distance or less, and generates a second predetermined point signal upon the distance signals being in a range representative of a second predetermined distance or less, with the second predetermined distance being less than the first predetermined distance. A fault signal is generated upon the second predetermined point signal being generated within a predetermined time interval relative to the generation of the first predetermined point signal.

Hence, when the laser's optical path is sufficiently clean or unobstructed, and the distance between the two objects is decreasing, during normal operation the laser distance detector will receive the reflected laser and generate signals representative of the distance between the objects, without significant interruption, except when the objects are very far apart, at which large distances the strength of the reflected laser received by the laser distance detector may be insufficient to allow it to make distance determinations. Accordingly, except for the times during which the objects are too far apart, the laser distance detector will generate signals representative of the actual distance between objects at virtually the precise time the objects are separated by that measured distance. Hence, the laser distance detector will generate a signal representative of the distance between the objects being within a first predetermined distance, a real time interval prior to the laser distance detector generating a signal representative of the distance between the objects being within a second, lesser predetermined distance of one another. When the laser optical path is sufficiently unobstructed, the aforementioned real time interval is greater than the aforementioned predetermined time interval, and therefore no fault signal is generated.

Although in accordance with the present invention the strength of the received reflected laser is not used in determining the distance between the objects, naturally the strength of the received reflected laser increases as the distance between the objects, and hence the distance over which the laser travels, decreases. In many applications, even when the laser's optical path is unobstructed, the strength of the laser is insufficient to allow distance determinations to be made when the distance between the objects is at or near its greatest. However, as the distance between the objects decreases, the strength of the received reflected laser will continue to increase until at some closer distance (which distance will vary depending upon the amount of obstruction in the laser's optical path) the strength of the received reflected laser will be large enough that the ability to analyze the characteristics of the received reflected laser to determined the distance between the objects is regained. In accordance with one aspect of the present invention, when the laser distance detector is unable to make distance determinations, it outputs a default distance signal representative of an infinite distance or a distance which is at least larger than that which will be realized for a given application.

As the laser's optical path first begins to become dirty or otherwise becomes only slightly obstructed, the distances at which the received reflected laser is unable to make distance determinations decreases. That is, the objects must now be closer together before the strength of the laser is sufficient enough to allow distance determination to be made as compared with a clean optical path. Therefore default infinite distance signals are generated not only when the objects are farthest apart, but now also continue to be generated even after the objects have moved a little closer together. As the distance between the objects decreases, the strength of the received reflected laser increases, and at some distance the reflected laser is able to overcome the obstruction enough to allow the characteristic of the reflected laser to be analyzed, and the generation of distance signals representative of the actual distance between objects is resumed.

As the laser's optical path becomes increasingly obstructed, the objects must be increasingly closer together before the reflected laser can pass sufficiently through the obstruction to generate actual distance signals again. In most applications, there is no concern with the loss of actual distance signal generation at very large distances. However, at some point, the obstruction becomes sufficient enough that the interrupted actual distance signals are not resumed until after the distance between the objects has become less than both a first predetermined distance point and a second predetermined distance point at which points it is considered important to be certain that actual distance signals are being generated in order to assure collision avoidance. Prior to the objects becoming sufficiently close together that generation of actual distance signals is resumed, the first and second voltage level detectors 30 and 34 only realize the voltage level signal 28 (10 volts) which corresponds to the infinite distance default signal, and when the objects become close enough together that actual distance signal generation does resume, if the actual distance between the objects at this point is less than both the first and second predetermined points, the signals representative of the distance between the objects being within a first predetermined range and the signals representative of the distance between the objects being within a second predetermined range are generated simultaneously, or within the predetermined time interval of the gate opening. Hence, the time interval between the point at which the laser distance detector generates the signal representative of the distance between the objects being within the first predetermined range, and the point at which the laser distance detector generates the signal representative of the distance between the objects being within a second predetermined range, is zero. Since this zero time interval is less than the predetermined time interval, a fault signal is generated to alert an operator that the laser optical path is obstructed to an unacceptable degree.

BRIEF DESCRIPTION OF THE DRAWINGS

In the drawings, wherein like elements are referenced alike:

FIG. 2 is a graph illustrating the relationship between the processed laser output signal and the distance between objects under both clean and obstructed optical paths;

DETAILED DESCRIPTION OF THE PREFERRED EMBODIMENT(S)

Figure 1:
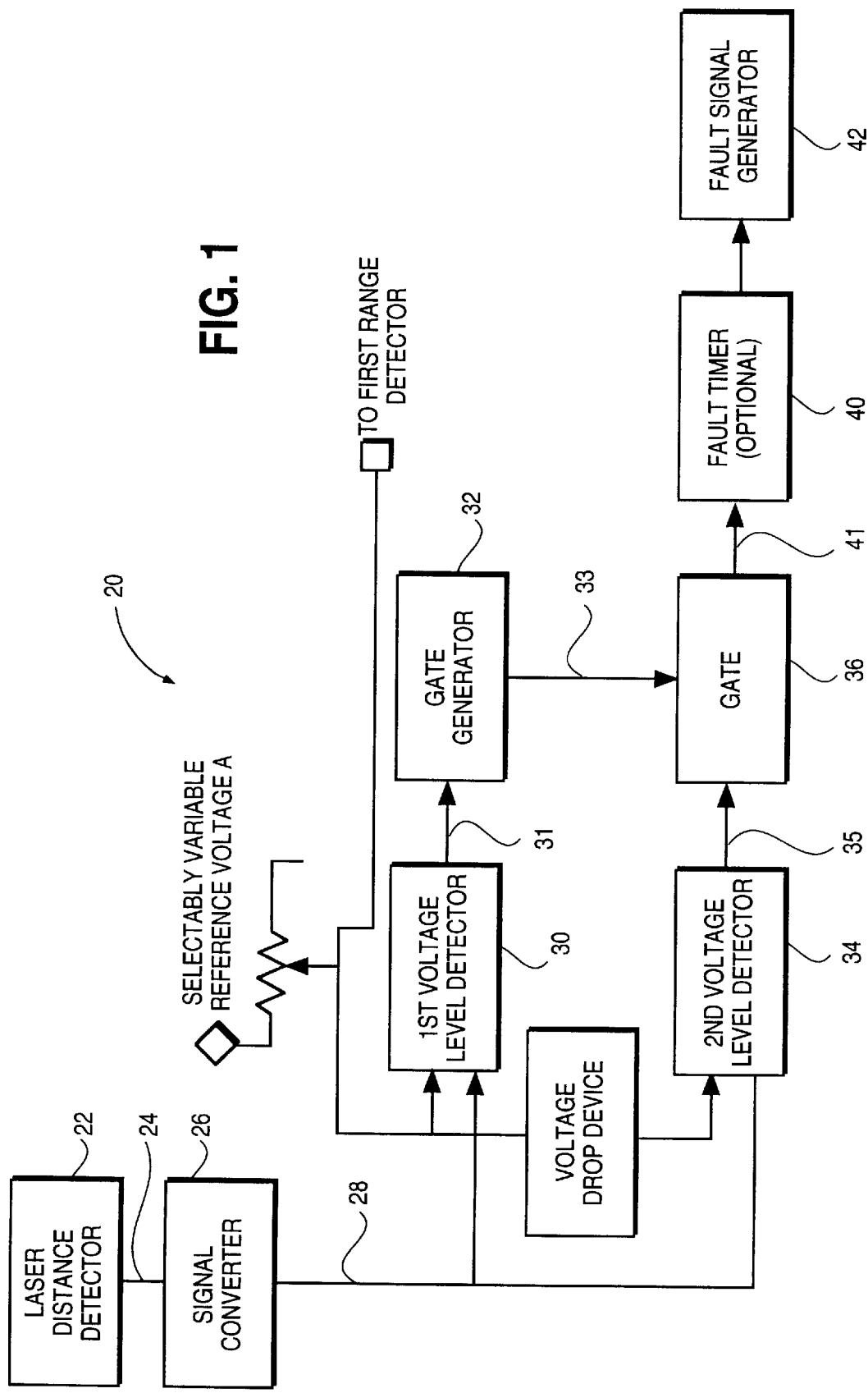
FIG. 1 is a block diagram of a laser optical path degradation detecting device embodying various features of the present invention.

A laser optical path degradation detecting device suitable for use in collision avoidance applications and embodying various features of the present invention is illustrated in block diagram in FIG. 1 and referred to generally by reference numeral 20. The device lends itself to use with anti-collision of overhead cranes and much of the discussion below is in connection with this application of the invention; however, the invention is not limited in this regard and it will be readily apparent to those skilled in the art that the present invention lends itself to use with a large number of applications. A typical laser anti-collision application consists of a laser distance detector 22 having a laser transmitting and receiving member on a first one of the two objects and a laser reflector on the second of the two objects. The laser beam emitted from the first object is reflected off the reflector on the second object and the reflected laser beam is received back again at the first object. With pulse technology or phase technology, a measurable characteristic of the laser beam varies with the distance over which the laser beam travels from the laser beam transmitting and receiving member, reflecting off of the laser reflector on the second object, and being received again by the laser beam transmitting and receiving member. In this manner, the distance between the objects may be determined. Accordingly, the present invention is for use with laser distance measurement devices that do not use the signal strength of the laser as the means for distance measurement, but instead use non-strength-dependent distance measurement technology such as pulse technology or phase technology for distance measurement. The signal strength of the received reflected laser needs only be adequate enough for the laser distance detector 22 to determine the actual distance separating the objects by a pulse or phase technology.

Although in accordance with the present invention the strength of the received reflected laser is not used in determining the actual distance between the objects, naturally the strength of the received reflected laser increases as the actual distance between the objects, and hence the distance over which the laser travels, decreases. When the laser's optical path becomes sufficiently dirty or obstructed, at large enough actual distances between the objects there will be an insufficient enough reception of the reflected laser that the ability to analyze the characteristic of the reflected laser to determine the range or actual distance between two objects is lost. However, as the actual distance between the objects decreases, the strength of the received reflected laser will continue to increase until at some closer actual distance the strength of the received reflected laser will be large enough that it overcomes the obstruction to the laser's optical path sufficiently that the ability to analyze the characteristics of the received reflected laser to determined the actual distance between the objects is regained.

With reference to FIG. 1, the optical path degradation detecting device 20 of the preferred embodiment comprises a laser distance detector 22 which uses a laser for detecting the distance between two objects and outputs actual distance signals 24 representative of the detected actual distance between two objects, such as two cranes or a crane and a wall. In the preferred embodiment, the distance signals are amperage levels which vary from 4 mA to 20 mA in relations to the measured distance between the two objects. This current range is preferred since it has been found to be affected very little by electrical "noise" commonly present in production facilities.

In the preferred embodiment, a signal converter 26 receives the actual distance signals 24 and converts the distance signals 24 to corresponding voltage level signals 28 and outputs the voltage level signals. Hence, the amplitude, or level, of the voltage is now representative of the actual distance between the objects. It will be readily apparent to those skilled in the art that any one or more of a wide variety of signals other than voltage may be employed as the signals representative of the distance between the objects for carrying out the present invention. In the illustrated embodiment, the laser distance information or signals 24 coming from the laser distance detector 22 are modified to a linear voltage ramp signal that varies from zero volts, which corresponds to a range or actual distance between the objects of zero feet, to 10 volts representative of an actual distance of 150 feet. For distances beyond 150 feet, the voltage will remain at 10 volts. That is, the output of the voltage ramp signal remains constant at 10 volts from 150 feet out to infinity. When the ability of the laser distance detector to determine the actual distance between the objects is lost or interrupted, default distance signals representative of an infinite distance, or at least representative of a distance greater than the first predetermined distance, are generated. These are converted to voltage level signals, which in the case of the illustrated example, would be 10 volts for infinite distance signals.

Of course, any predetermined voltage ramp profile may be employed, including non-linear profiles, and the invention is not limited in this regard. For instance, a voltage ramp which is the reverse of that illustrate in FIG. 2 may be employed, in which the voltage ramp signal goes from, say, 10 volts at zero feet to zero volts at 150 feet or greater. Although the voltage ramps discussed above are linear, non-linear relations between voltage and distance may also be employed.

A first voltage level detector 30 receives the voltage level signals 28 and outputs a first predetermined point signal 31 to a gate generator 32 when the received voltage signal is first detected as being at or below the predetermined trigger voltage of the first voltage level detector 30. A second voltage level detector 34 receives the voltage level signals 28 and outputs a second predetermined point signal 35 to a gate 36 when the received voltage level signal 28 is first detected as being at or below the predetermined trigger voltage of the second voltage level detector 34.

The gate generator 32 produces a gate actuating signal 33 of short, predetermined pulse duration, upon receipt of the aforementioned first predetermined point signal. For reasons which will become more clear below, in order to prevent erroneous fault signals, the predetermined duration of the gate actuating signal is set to be significantly less than the time required for the distance between the two objects to be reduced by the amount of distance between the first and second distance points when the objects move closer with respect to one another at their respective maximum speeds. While the gate actuating signal 33 is received by the gate 36 (i.e. for the predetermined pulse duration), the gate remains "open" to allow passage of the second predetermined point signal 35 from the second voltage level detector 34 through the gate 36 to a fault signal generator 42. In the absence of the presence of the gate actuating signal 33 from the gate generator 32, the gate 36 prevents the passage of the second predetermined point signal 35 from the second voltage level detector 34 from passing through the gate 36 and being received by the fault signal generator 42. An optional fault timer 40, such as that illustrated in the preferred embodiment, may be interposed between the gate 36 and the fault signal generator to limit the duration of, or otherwise control, the fault signal.

The manner in which the laser optical path degradation detecting device 20 of the present invention detects the point at which the laser optical path has become unacceptably obstructed will now be described in greater detail. The voltage level detectors 30, 34 only generate their respective predetermined point signals 31, 35 when they receive a voltage 28 from the signal converter 26 which is below their respective predetermined trigger voltages. If the reflected laser is received sufficiently unobstructed, the laser distance detector 22 which transmits and receives the laser will generate distance signals 24 representative of virtually every small incremental change in distance between the objects, with the signal converter 26 outputting a corresponding voltage level signal 28 representative of each small incremental change in distance between the objects. These voltage level signals 28 are output regularly until the laser optical path becomes too obstructed, whereupon an insufficient amount of the reflected laser is received by the laser distance detector for it to make distance determinations, distance signals representative of an infinite distance are generated. Accordingly, even though the actual distance between the objects continues to decrease, so long as the optical path of the laser is sufficiently obstructed, there is no corresponding generation of the lower voltage level signals 28 which would normally be generated at these decreased actual distances. That is, during the time the laser's optical path is obstructed to the extent that the laser distance detector 22 is unable to make distance determinations only high voltage level signals representative of an infinite distance are generated, and no corresponding voltage level signals representative of the actual decreased distance between the objects are generated, i.e. no lower voltage level signals are generated at these decreased actual distances.

As the laser's optical path first begins to become partially obstructed, the laser distance detector 22 will first lose its distance signal generating capability at the point of the farthest distance between the objects, since this is where the strength of the received reflected laser is weakest. At this early stage of only partial obstruction, the occlusion will be minimal enough that the laser will be able to pass sufficiently through the minimal obstruction after the distance between the objects decreases by only a small amount. Such loss and regaining of sufficient laser reception, and corresponding loss and regaining of actual distance signal generation, while the distance between objects is very large is not of particular concern in anti-collision applications.

However, as the laser's optical path becomes increasingly obstructed, the laser reception will still be insufficient to allow generation of distance signals at the point of the farthest distance between the objects. But with this increasing obstruction, it takes longer and longer, i.e. smaller and smaller distances between the objects, before the laser will be able to pass sufficiently through the obstruction to allow generation of actual distance signals. At some point, depending on the particular application, the extent of obstruction becomes large enough that the objects are too close together before generation of the actual distance signals is regained. That is, there is a minimum distance between the objects at which it is important to be certain that distance signals are being generated in order to trigger timely corrective action to enable prevention of collision between the objects. The laser optical path degradation device of the present invention may be used to indicate the point at which the laser's optical path has become obstructed to the extent that distance signals are not regained until the objects are closer together than this minimum distance.

With reference to FIG. 2, by way of illustrative example, suppose that in a particular application it is determined or decided that the minimum distance (the "first predetermined distance point") between the objects at which it is important to be certain that actual distance signals are being generated in order to trigger timely corrective action is 100 feet. With the linear ramp voltage signals of FIG. 2, the voltage level corresponding the 100 foot first predetermined distance point is 6.67 volts (this corresponding voltage is referred to as "reference voltage A"). Hence, the first voltage level detector 30 is set to trigger at 6.67 volts, whereby the first voltage level detector 30 is set to generate a first predetermined point signal 31 the first time it receives a voltage level signal 28 of 6.67 volts or less. The second voltage level detector 34 is set to trigger at a voltage level signal 28 slightly lower than the first voltage level detector 30, say, at 6 volts (this is "reference voltage B"), and the distance corresponding to reference voltage B is 87 feet and referred to as "the second predetermined point."

When the laser's optical path becomes obstructed a small initial amount such that distance determinations cannot be made (and, therefore, default infinite distance signals 24 are generated) from the time when the distance between objects is at its greatest to the time when the distance between objects is down, say, to 130 feet, at which point there is a sufficient reception of the laser that actual distance signal generation (with corresponding voltage level output) is resumed. The first voltage level detector 30 will receive voltage level signals 28 of 10 volts until the distance is 130 feet, and will not receive another, different voltage level signal 28 until the distance reaches 130 feet, at which time the first voltage level detector 30 will receive a voltage level signal of 8 volts (the voltage level signal corresponding to a distance of 130 feet). Since this voltage level is higher than the 6.67 volt trigger voltage of the first voltage level detector 30 (i.e. reference voltage A), no first predetermined point signal 31 is generated from the first voltage level detector 30 at this time. Also, since the 8 volt voltage level signal 28 is also higher than the trigger voltage of the second voltage level detector 34 (i.e. higher than reference voltage B), no second predetermined point signal is generated from the second voltage level detector at this time. However, as the distance between the objects continues to decrease further, with corresponding voltage level signals 28 representative of each of the small incremental distances being output, lower and lower voltage level signals 28 will be sent to the first and second voltage level detectors 30, 34. When the distance between objects decreases to the first predetermined distance point, at which point the voltage level signal 28 is "reference voltage A", the first voltage level detector 30 generates a first predetermined point signal 31. In this example, the first predetermined distance point is 100 feet and voltage level A is 6.67 volts. The first predetermined point signal 31 triggers the gate generator 32 which, in turn, generates a gate actuating signal 33 of predetermined duration. Responsive to the gate actuating signal 33, the gate 36 remains open during the duration of the gate actuating signal 33. The predetermined duration of the gate actuating signal 33 is such that the gate opening duration is significantly shorter than the shortest possible time which the distance between the objects can change from the first predetermined distance point to the second predetermined distance point, i.e. significantly less than the time required for the distance between the objects, when moving closer together with respect to one another at their maximum rate, to decrease from 100 feet to 90 feet. For illustrative purposes, in the present example it takes 0.5 seconds for the distance between the objects, when moving closer together with respect to one another at their maximum rate, to decrease from 100 feet to 90 feet; whereas the predetermined duration of the gate actuating signal 33 is set at 10 ms. Accordingly, at the time when the distance between the objects decreases to 100 feet, the gate 36 is open for a 10 ms. interval. Even if the distance between the objects continues to decrease at the maximum possible rate, the voltage level will not drop to 6 volts (reference voltage B, at which the second voltage level detector 34 generates a second predetermined point signal 35) until 0.5 seconds after the gate 36 has opened. Since the gate 36 will have closed after 10 ms., the gate 36 is closed well prior to the generation of the second predetermined point signal 35, and therefore the gate 36 does not allow passage of the second predetermined point signal 35 to the fault signal generator 42 (or fault timer 40, if employed).

With continued reference to FIG. 2, if, over time, the laser's optical path becomes increasingly obstructed to the point where the laser distance detector 22 cannot make distance determinations from the time the objects are farther apart until the objects are, say, 80 feet apart, such that no actual distance signals are generated until the actual distance between the objects is less than the first and second predetermined distance points, the fault signal generator 42 will be actuated to alert an operator of the unacceptably obstructed optical path as follows.

At the time when the actual distance between the objects is at its maximum and default distance signals are generated, whereby the last voltage level signal 28 received by the first and second voltage level detectors 30, 34 is 10 volts. No other voltage level signals are received again until the actual distance between the objects is 80 feet, at which time the generation of actual distance signals is resumed and the corresponding voltage level signal 28 of 5.33 volts is generated. Since the 5.33 voltage level signal 28 is less than the trigger voltages of both the first and second voltage level detectors, which are 6.67 volts and 6.0 volts, respectively (i.e. less than both reference voltage A and reference voltage B), and this is the first time these voltage levels lower than the trigger voltage levels are received by the first and second voltage level detectors 30, 34, both the first and second predetermined point signals 33 and 35 are generated simultaneously when the 5.33 voltage level signal, which is representative of the actual 80 foot distance, is received. Therefore, the second predetermined point signal 35 is generated at the same time the gate is open for 10 ms., whereby the second predetermined point signal 35 is allowed to pass through the gate 36 while it is still open, to actuate the fault signal generator 42, thereby alerting an operator of an unacceptably obstructed optical path. Since at the largest distances between the objects, at which the strength of the received reflected laser is insufficient to allow generation of actual distance signals, a default distance signal representative of a distance greater than the first predetermined distance is generated, the problem of fault signal generation at such large distances is overcome.

The reference voltage A may be made variable to any selective voltage, such as by use of a voltage pot to allow selective variation of reference voltage A. Reference voltage B may also be selectively variable to any selective reference voltage B; however, in the preferred embodiment, the reference voltage B is proportional to reference voltage A and reference voltage B is determined by a voltage dropping device as indicated in FIG. 1, rather than being independently variable. In the illustrated embodiment, a diode is used as a voltage dropping device. The purpose of this voltage dropping device is to set the level at which the second level detector will trigger to be slightly lower than that of the first voltage level detector. Thus, at the maximum speed of the vehicle being protected, the ramp voltage will not be able to reach the second level voltage within the given period of time which is controlled by U6A, unless the optical path has been obstructed. Although a diode is illustrated for use in effecting the desired voltage level drop, any of a wide variety of other voltage dropping devices may be well suited for their particular applications.

Figure 3A:
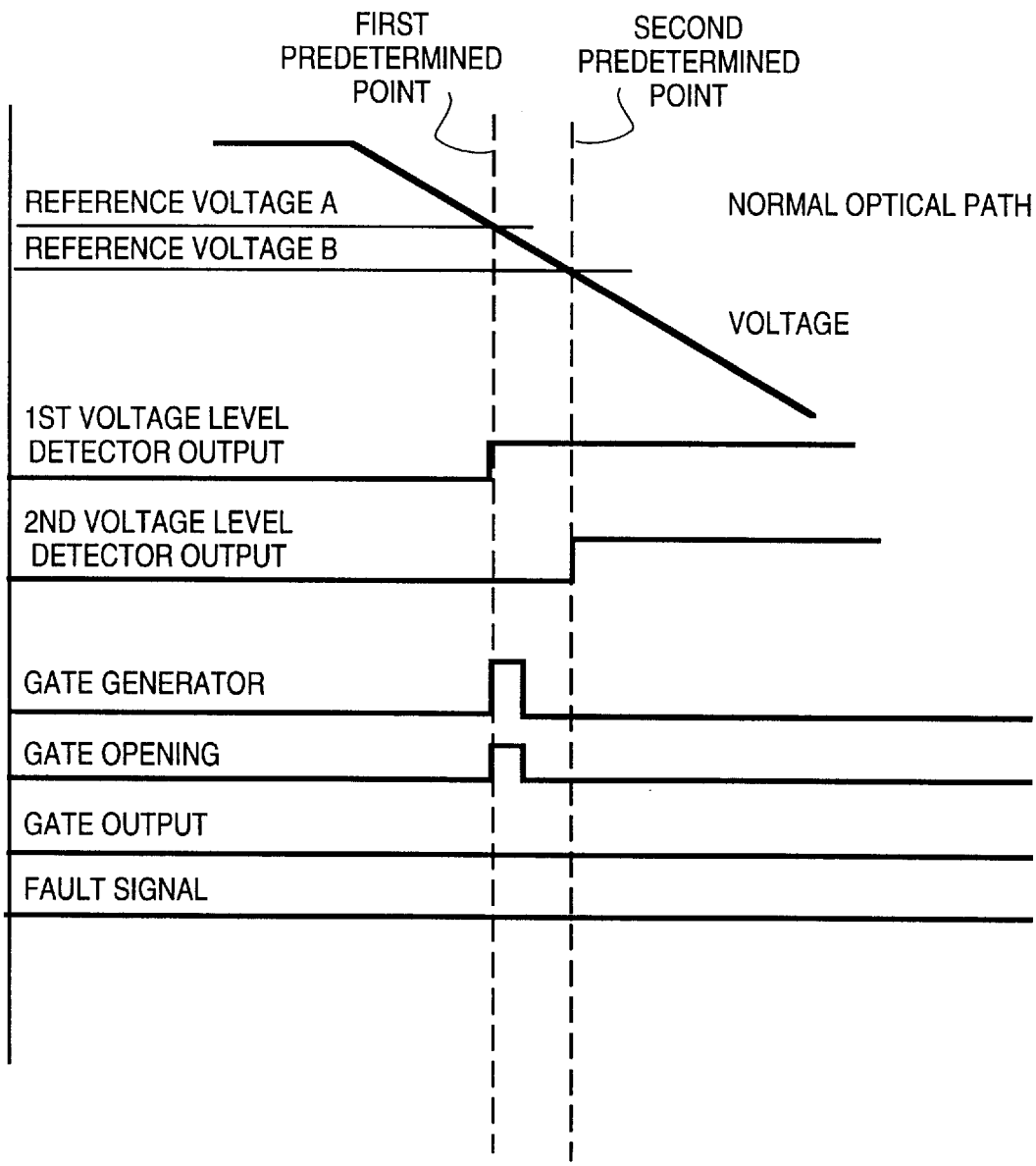
FIG. 3A is a schematic representation of the signal relationships for the laser optical path degradation detecting device of FIG. 1, as generated with an acceptable laser optical path.

With reference to FIG. 3A, which illustrates the signal relationships for a sufficiently clean optical path in accordance with the present invention, as the voltage ramp or signal drops below reference voltage A, the first level detector output goes high, the gate generator generates a short high pulse effecting a short gate opening interval. Since the reference voltage has not dropped to reference voltage B yet during the short interval during which the gate generator signal is high and therefore the gate is open, no high second predetermined point signal is output from the gate 36, and, hence, no fault signal 41 is generated. That is, the second predetermined point signal does not go high until after the gate has closed.

Figure 3B:
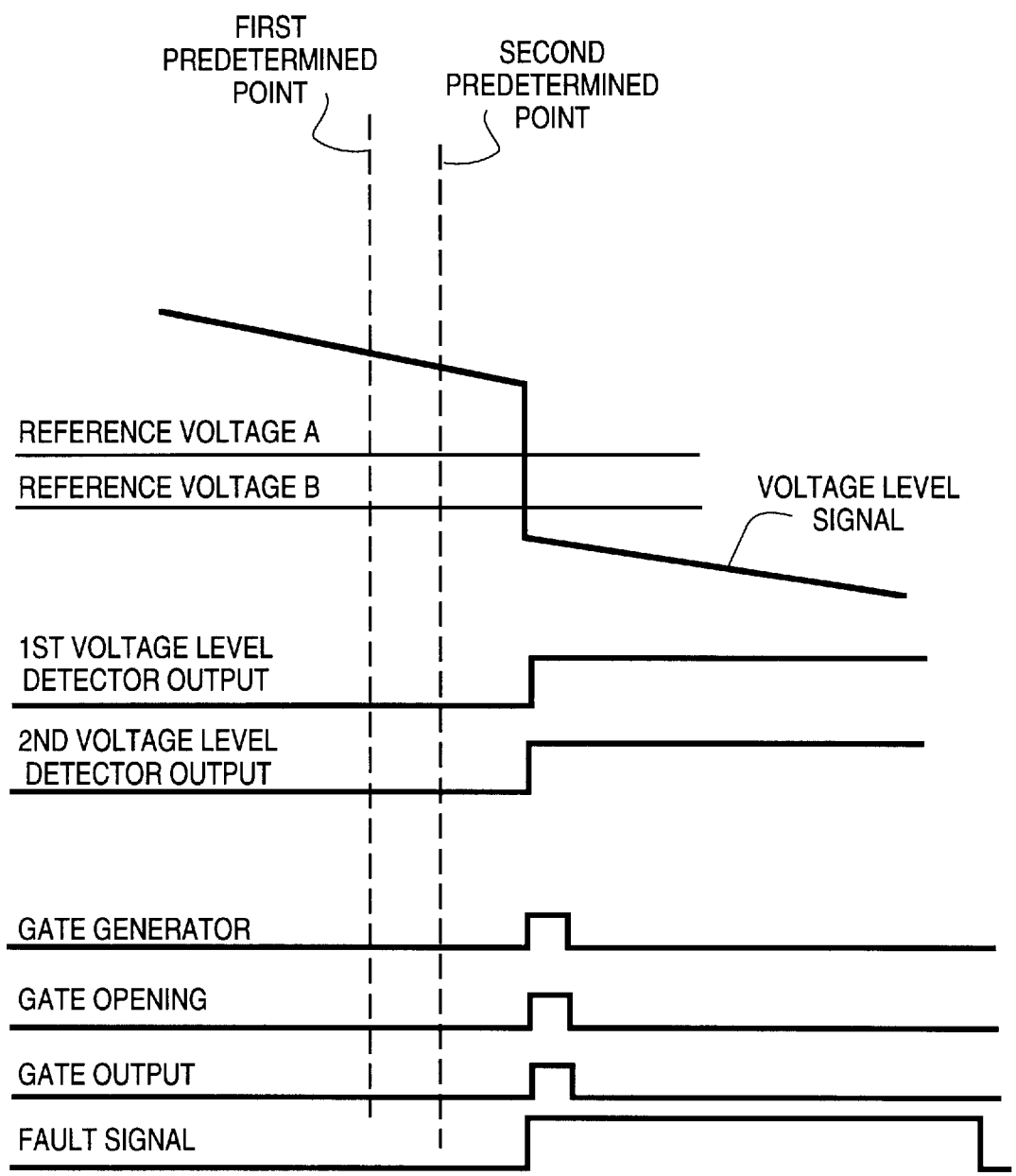
FIG. 3B is a schematic representation of the signal relationships for the laser optical path degradation detecting device of FIG. 1, as generated with an unacceptable laser optical path.

By comparison, reference is now made to FIG. 3B, which illustrates the signal relationships for an insufficiently clean or unacceptably obstructed optical laser path. The reference voltage signal 28 drops below both reference voltage A and reference voltage B simultaneously, whereby the first predetermined point signal 31 and the second predetermined point signal 35 both go high simultaneously, or within the predetermined time interval of the gate opening, and the gate generator 32 generates the same short high pulse signal 33 effecting the same short gate opening interval in the same manner as in FIG. 3A. However, in this situation, the first time the voltage level signals are detected to be at or below voltage level A, the voltage level is also below voltage level B, so that the second predetermined point signal 35 is high while the gate is open, whereby the high second predetermined point signal 35 is allowed to pass through the gate 36 and trigger the fault signal generator 42.

Figure 4:
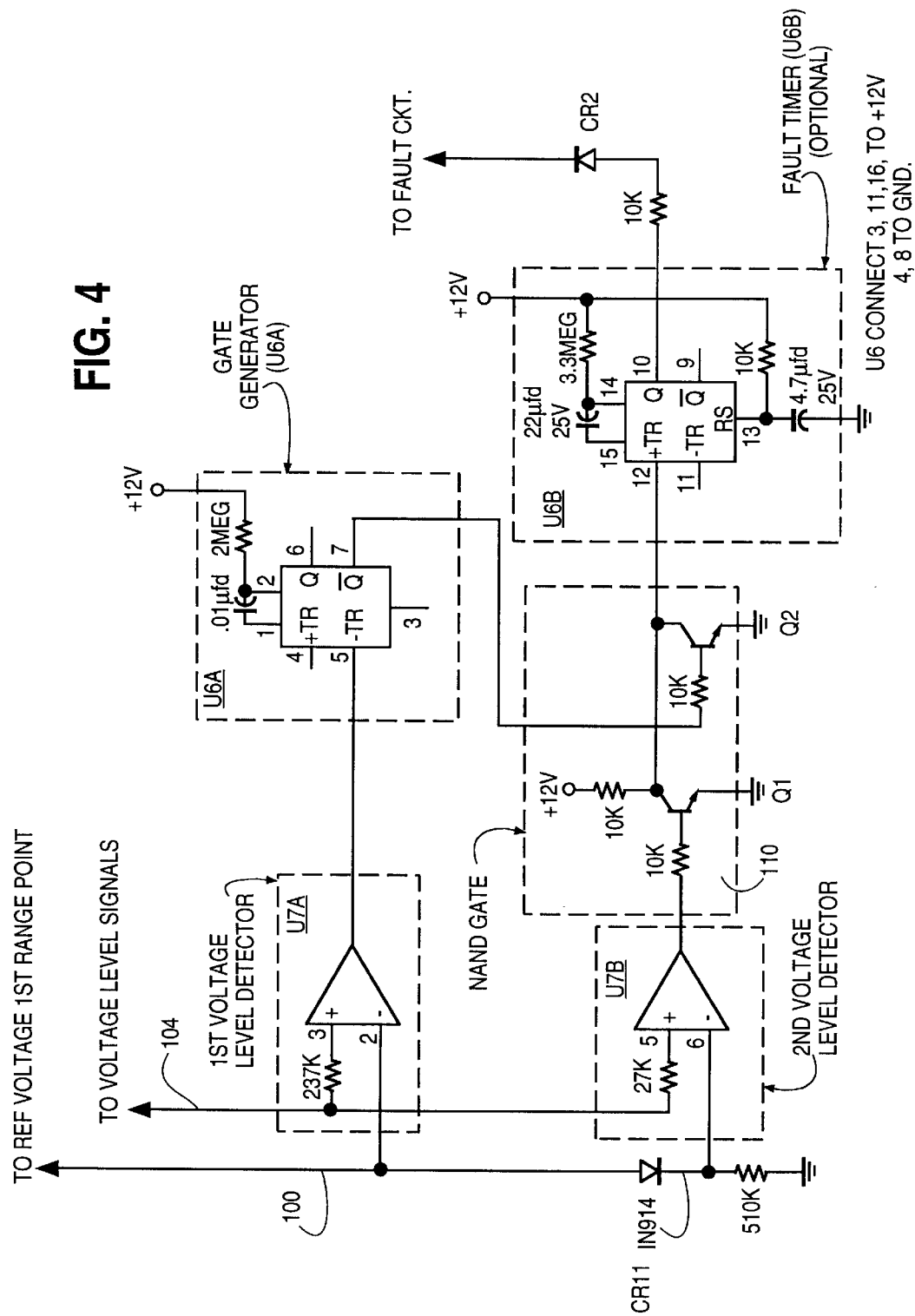
FIG. 4 is a circuit diagram of a preferred embodiment circuit for use with the laser optical path degradation detecting device.
Figure 5:
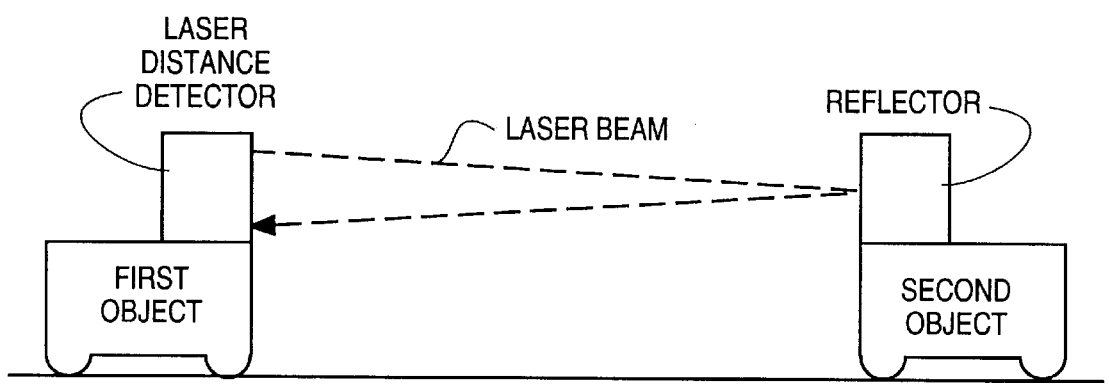
FIG. 5 is a representation of a first object having a laser distance detector mounted thereto and a second object having a reflector mounted thereto.

FIG. 4 illustrates a circuit which has been found well suited for carrying out the present invention. The fault timer and gate generator are retriggerable monostable oscillators, and may both be provided in a single, common integrated circuit (IC). The 4.7 μfd capacitor illustrated in FIG. 4 is a power on reset to prevent generation of a fault signal when powering up the circuitry. The retriggerable monostable oscillators U6A and U6B are designed for pulse widths of 10 ms. and 30 sec., respectively. One or both of the 0.01 μfd capacitor and/or 2 megohm resistor of retriggerable monostable oscillator U6A may be changed or replaced to provide a different pulse width, as desired for different applications. Likewise one or both of the 22 μfd capacitor and/or 3.3 megohm resistor of retriggerable monostable oscillator U6B may be changed or replaced to vary the duration of the fault timer.

It is felt that the laser's optical path will become increasingly obstructed on a gradual basis as dirt builds up on the optics of the laser's lens and on the reflective target surface. Therefore, a catastrophic failure due to a sudden and total loss in the optical path is not expected, and the invention is not designed to detect such a sudden, complete blocking of the laser optical path. Rather, the present invention is a dynamic method in which a gradual degradation to the optical path can be detected. The first predetermined distance point should be selected at a distance between objects which is frequently encountered, since the device 20 will only indicate the presence of an unacceptably obstructed optical path when the distance between objects decreased from a distance greater than the first predetermined distance point to a distance less than the second predetermined distance point.

In many collision avoidance system applications, such as cranes, two or more set points are provided, whereby when the distance corresponds to a first set point, the crane speed decreases and when the distance corresponds to a second set point, the crane is stopped. In the preferred embodiment of the invention, the first predetermined distance point (and hence, reference voltage A) corresponds to the first set point, although this need not necessarily be the case, and any reference voltage may be used as reference voltage A. Reference voltage A, which may be selectively adjustable by voltage pots to allow setting of the first set point at the maximum distance away from the target that the crane must be decelerated at dependent upon the particular application.

The output of the fault timer, may be directed to the fault circuitry in the distance detector circuits, which may effect, for instance, stoppage of the crane and/or sounding of an alarm.

As can be seen, by properly setting the voltage dropping device and the timing of the gate generator, the sensitivity of the device 20 may be varied. The voltage drop device determines the offset distance at which the fault signal generator 42 is actuated. For instance, with a relatively large voltage drop, the fault signal may be generated at 90 feet; whereas, with a relatively small voltage drop, the fault signal would be generated at 99 feet instead of 90 feet. The optimum voltage drop for any given application is dependent upon the particulars of that application, and in some instances a smaller voltage drop may be desired to actuate a fault signal closer to the first predetermined distance point. The duration of the gate opening is set such that, for the given offset, the time interval is less than the minimum time required for the distance between the objects to decrease from the first predetermined distance to the second predetermined distance when the distance between the objects is decreasing at maximum rate.

The amount of distance loss before detection can be easily adjusted to a distance that is considered safe for a given application. In this regard, the shorter the duration of the gate actuating pulse 33 and/or the smaller the difference in the trigger voltages of the first and second voltage level detectors (i.e. the voltage drop), the more sensitive or accurate the system. However, in applications which do not require high sensitivity, it may be desirable to use less costly components which do not generate extremely small and/or accurate gate pulse widths and voltage drops, in order to reduce costs. Also, some applications may require exposure of the circuitry to varying temperature conditions, and it is important to be certain that the system is sufficiently accurate for a given application under all temperature conditions. Otherwise, for instance, temperature variations may result in the gate pulse width becoming too long, such that fault signals are triggered even during normal, clean operating conditions. Likewise, if the voltage drop becomes too small due to the effects on the circuitry brought about by changed temperature, then, too, fault signals may be triggered even during normal, clean optical operating conditions.

With reference now to the circuit diagram of FIG. 4, which illustrates one circuit which has been found suitable for carrying out the present invention, line 100 is electrically connected to a potentiometer, or alternatively to a set voltage source, and is connected to pin 2 of operational amplifier (op amp) U7A and defines the trigger voltage of the operational amplifier U7A. It should be noted that the op amps are employed as voltage comparators, and that voltage comparators may be employed rather than op amps. Likewise, the line 100 passes through diode CR1 which reduces the voltage at line 102 by approximately 0.4 volts, which voltage is connected to pin 6 of op amp U7B to define the trigger voltage of the op amp U7B. Line 104 varies between 0 volts and 10 volts proportional to the distance between the objects, as discussed above.

There are essentially three different conditions which this circuit must distinguish and respond appropriately. The first condition is when the distance between objects is very large, and the voltage level signal at line 104 is at 10 volts. Since the voltage to pin 3 is higher than the voltage to pin 2, the output of op amp U7A is 12 volts, which is supplied to pin 5 of retriggerable monostable oscillator U6A which results in an output of 12 v from pin 7 which goes to Q2 of NAND gate 110 and turns Q2 "ON" so that pin 12 of retriggerable monostable oscillator U6B is grounded, and the output of pin 10 is 0 volts, resulting in no fault circuit actuation. The output from op amp U7B is 12 volts resulting in Q1 of the NAND gate being "ON". Since Q1 and Q2 are not both "OFF" at the same time, 0 volts is received at pin 12 and, hence, retriggerable monostable oscillator U6B (the fault signal timer) is not actuated and no fault signal is generated.

The second condition is when the distance between the objects is such that the voltage level signal 104 is below the trigger voltage for op amp U7A, but above the trigger voltage of op amp U7B. Under this condition, since the voltage to pin 3 is lower than the voltage to pin 2, the output of op amp U7A is 0 volts, which 0 volts is supplied to pin 5 of retriggerable monostable oscillator U6A to trigger an output of 0 v from pin 7. This 0 volts output goes to Q2 and turns Q2 of NAND gate 110 "OFF" for the 10 ms. gate duration which is defined by the capacitor-resistor combination present in U6A. Since the voltage level signal at line 104 is higher than the trigger voltage of op amp U7B, the output of op amp U7B is 12 volts, which turns Q1 "ON". Since both Q1 and Q2 are not "ON" at the same time, pin 12 of retriggerable monostable oscillator U6B is at 0 volts and the output of pin 10 is 0 volts, whereby retriggerable monostable oscillator U6B (the fault signal timer) is not actuated and no fault signal is generated. Also, if the voltage of line 104 drops below the trigger point of op amp U7B, during the 10 ms. gate interval, then a fault signal will be generated.

Under the third condition, the voltage level signal at line 104 is lower than the trigger voltages of both op amp U7A and op amp U7B. As discussed above, when the voltage level to pin 2 is greater than the voltage level to pin 3, the op amp U7A outputs 0 volts and the output of the retriggerable monostable oscillator U6A turns Q2 "OFF" for the 10 ms. gate duration. With the voltage level signal at line 104 also being below the trigger voltage of the op amp U7B, the output of op amp U7B is 0 volts, which turns Q1 "OFF". Since the triggering voltage levels signals are received by both op amps U7A and U7B simultaneously, or within the 10 ms. window of one another, the Q1 and Q2 will be "OFF" at the same time within the 10 ms. window, allowing the 12 volts from source 108 to be imparted to pin 12 of retriggerable monostable oscillator U6B. This 12 volt signal to pin 12 actuates the retriggerable monostable oscillator whereby it outputs 12 volts for 30 seconds (which duration is defined by the 22 µfd capacitor and 3.3 megohm resistor), and a 12 volt signal is sent to the fault signal generator 42 (see FIG. 1) for the 30 second interval to which the timer is set.

The laser distance detector, including the laser transmitting and receiving device, are obtainable from Laser Technology Corporation of Engelwood, Colo. The op amps U7A and U7B are available under model name LMC6482 from National Semiconductor of Santa Clara, Calif. The retriggerable monostable oscillators U6A and U6B are available as model name CD4098 from Harris Semiconductor of Melbourne, Fla. The transistors are available as NPN Transistors model 2N4401 from Motorola Inc. of Phoenix, Ariz. All of these components are readily available from several different manufacturers and suppliers, and the above list of sources is for reference and not meant to impart or imply any limitations.

The above describes the circuit for the optical path loss detector, which would generally be used in conjunction with the distance detector circuits for the laser anti-collision system. It can also be incorporated within the laser system itself. However, since it works best by utilizing the first distance point setting, the circuit lends itself to be part of the distance detector circuits.

In accordance with another method for carrying out the present invention, particularly suitable for use as part of the laser distance detector's own system, since the laser distance detector measures the distance and also has the capability of determining the signal strength of the laser signal being received when it is measuring its distance, the laser itself can determine the required signal strength for any given distance. Data representative of the predetermined relation between laser signal strength and distance between objects are stored in computer memory, which computer memory is already present, or could be made part of, the laser distance detector. As the laser distance detector receives data information representative of the distance being measured, the actual signal strength can then be compared to the predetermined profile that is stored in memory, and if there is a significant enough difference between the stored predetermined laser strength and the actual laser strength as measured, the microprocessor outputs a fault signal indicating a loss in the laser optical path. All that would be required to implement this system within existing laser distance detectors is an analog-to-digital converter which is used for feeding back signal strength information to the microprocessor, and the distance information would have already been processed within the microprocessor. Other than the addition of an analog-to-digital converter, the rest of the application could be implemented in software.

The use of lasers in applications such as overhead cranes which travel considerable distances from their reflective target and which are subject to shaking and vibrations is difficult due to the fact that it is important that the emitted laser signal be continually reflected and received again despite the sometimes vast distances and shaking which occur. Also, industrial overhead cranes have a narrow width relative to their considerable length, and such cranes tend to become skewed, with one side becoming ahead of the other side. A standard laser beam, having a very narrow dispersion has been found to present frequent problems when used in such applications as cranes due to the propensity of the tight laser path to deviate outside of the close tolerance allowable. In addition to the present invention allowing for detection of a dirty laser optical path, the present invention may also be used to provide detection of a laser beam repeatedly deviating outside of, and back within, its effective optical path. However, it is desired to use a broader dispersion of the laser to minimize the propensity for fault signal generation associated with deviations of the laser. Too broad a dispersion of the laser beam used in such applications is undesirable since an insufficient amount of the laser may be reflected back and/or too high powered of a laser may be required in such applications. It has been found that dispersion of the laser in the range of 2 degrees to 10 degrees of dispersion, and preferably approximately 5 degrees of dispersion, allows a corresponding degree of inaccuracy in the laser aiming, so that large distances, shaking and skewing of the laser or reflector are less likely to cause erroneous distance determinations or loss of ability to make a distance determination.

Although the invention is described by way of preferred and other specific illustrative embodiments and methods, it will be apparent to those skilled in the art that many modifications may be made without departing from the spirit and scope of the invention, as set forth in the accompanying claims.

What is claimed is:

1. A laser optical path degradation detecting device for use in preventing collision of two objects, at least one of which is movable with respect to the other, the device comprising:

a laser distance detector which uses a laser beam to detect the distance between said two objects and which generates actual distance signals representative of the distance between said two objects;

voltage level detector means responsive to the distance signals for generating a first predetermined point signal upon the distance signals being in a range representative of a first predetermined distance or less, and generating a second predetermined point signal upon the distance signals being in a range representative of a second predetermined distance or less, wherein the second predetermined distance is less than the first predetermined distance;

means for determining if the second predetermined point signal is generated within a predetermined time interval relative to the generation of the first predetermined point signal; and means for generating a fault signal upon the occurrence of said second predetermined point signal being generated within said predetermined time interval relative to the generation of said first predetermined point signal.

2. A device in accordance with claim 1 in which said means for determining if the second predetermined point signal is generated within the predetermined time interval relative to the generation of the first predetermined point signal comprises:

a gate signal generator for generating a gate signal of predetermined duration upon generation of said first predetermined point signal; and a gate for receiving said gate signal and said second predetermined point signal, with the gate allowing passage of said second predetermined point signal during receipt of said gate signal and blocking passage of said second predetermined point signal in the absence of said gate signal.

3. A device in accordance with claim 2 in which said means for generating the fault signal upon the occurrence of said second distance signal being generated within said predetermined time interval of the generation of said first distance signal comprises:

a fault signal generator for receiving the second predetermined point signal from the gate and generating the fault signal upon receipt of said second predetermined point signal.

4. A device in accordance with claim 2 in which the laser distance detector generates said distance signals representative of the distance between the objects at predetermined distance signal intervals which are shorter than the predetermined duration of the gate signal.

5. A device in accordance with claim 1 in which the signals representative of the distance between the objects is a voltage level which varies in predetermined relation with respect to the distance between the objects.

6. A device in accordance with claim 5 in which the voltage level detector means generates said first predetermined point signal upon the voltage level dropping below a first predetermined voltage level, and the voltage level detector means generates said second predetermined point signal upon the voltage level dropping below a second predetermined voltage level which is less than said first predetermined voltage level.

7. A device in accordance with claim 5 in which the voltage level detector means generates said first predetermined point signal upon the voltage level becoming at or below a first predetermined voltage level, and the voltage level detector means generates said second predetermined point signal upon the voltage level becoming at or above a second predetermined voltage level which is greater than said first predetermined voltage.

8. A device in accordance with claim 1 in which the predetermined time interval is less than the minimum time required for the distance between objects to decrease from said first predetermined distance to said second predetermined distance when the distance between the objects is decreasing at maximum rate.

9. A device in accordance with claim 1 in which the laser distance detector generates a default distance signal representative of a distance greater than said first predetermined distance when the laser distance detector is unable to detect the distance between the two objects.

10. An optical path degradation detecting device for use in preventing collision of two objects, at least one of which is movable with respect to the other, and used with a laser distance detector which uses a laser for detecting the distance between said two objects and outputting distance signals representative of at least a first predetermined distance and a second predetermined distance, the device comprising:

a converter responsive to the distance signals for converting the distance signals to corresponding voltage level signals and outputting said voltage level signals;

a first voltage level detector responsive to said voltage level signals for outputting a first predetermined distance point signal when said voltage signals reach a first predetermined voltage or less;

a second voltage level detector responsive to said voltage level signals for outputting a second predetermined distance point signal when said voltage signals reach a second predetermined voltage or less;

a gating member responsive to said first predetermined distance point signal and said second predetermined point signal for allowing output of said second predetermined distance point signal only during a predetermined pulse interval relative to receipt of said first predetermined distance point signal; and a fault signal generator responsive to said second predetermined distance point signal for generating a fault signal upon receipt of said second predetermined distance point signal;

whereby, when the optical path of the laser is of sufficiently acceptable integrity, the time interval between said output of the first predetermined distance point signal and the output of the second predetermined distance point signal is greater than said predetermined pulse interval and passage of the second predetermined distance point signal is blocked by the gating member such that the second predetermined distance point signal is not received by the fault signal generator and no fault signal is generated, and when said laser optical path is of insufficiently acceptable integrity, the time interval between said output of the first predetermined distance point signal and the output of the second predetermined distance point signal is less than said predetermined pulse interval and the gating member allows passage of said second predetermined distance point signal to said fault signal generator and a fault signal is generated indicating the presence of said insufficient laser optical path.

11. A device in accordance with claim 10 in which the predetermined pulse interval is less than the minimum time required for the distance between the two objects to decrease from said first predetermined distance to said second predetermined distance when the distance between the two objects is decreasing at maximum rate.

* * * * *